Nov. 2, 1971   B. CAMPRUBI   3,616,492
MOULDING

Filed Feb. 14, 1969   7 Sheets-Sheet 1

INVENTOR
BARTHOLOMEW CAMPRUBI

United States Patent Office 3,616,492
Patented Nov. 2, 1971

---

3,616,492
MOULDING
Bartholomew Camprubi, 29 Campden Road,
Ickenham, Middlesex, England
Filed Feb. 14, 1969, Ser. No. 799,315
Int. Cl. B29c 9/00
U.S. Cl. 18—20 RR          24 Claims

ABSTRACT OF THE DISCLOSURE

A machine is disclosed for the automatic separation and realignment of parts of a sub-mould in which an article such as a commutator is produced on a separate moulding machine. The machine incorporates a number of separable carriers which are automatically moved to carry the sub-mould parts away from one another to enable operations to be carried out on at least some of the sub-mould parts, e.g. ejection of the article moulded and subsequent cleaning, followed by automatic insertion of mould inserts prior to closure of the sub-mould ready for a further moulding operation.

---

This invention relates to a machine for opening and/or closing a sub-mould. The term "sub-mould" is intended to mean a structure including at least two separable forces which when closed have a combined internal contour conforming to the external form of a part to be moulded therein, the separable forces having means to enable them to be maintained in correct closed alignment whilst being placed on or removed from a moulding press.

A considerable number of sub-moulds of this type may for example be used on a rotary press for example for the manufacture of commutators. It is envisaged, therefore, that it will be desirable to provide methods for readily handling the sub-moulds prior to and after they are operated upon by the moulding press.

According to the present invention a machine for opening and/or closing a sub-mould as hereinbefore defined comprises at least two relatively movable carriers adapted to be moved between a first position, in which they are capable of receiving the closed sub-mould, and a second position in which the carriers are relatively displaced to move one part of the sub-mould away from the other part to enable an operation to be carried out on at least one part independently of the other part.

The sub-moulds may be of various forms but conveniently they are such that the carriers are initially separable in a first direction and then movable relatively to one another in a second direction. For example the first direction comprises a linear direction and the second direction an arcuate direction.

Specifically the sub-mould parts may have aligned apertures facing one another in the closed position, the margins of the apertures lying substantially in a plane or planes which extend(s) normal to the linear direction of movement but parallel to a plane containing the arcuate direction of movement. For certain applications the sub-mould may include more than two parts. For example for a commutator the sub-mould may include three parts of which at least two parts are received by movable carriers capable of moving in different directions with respect to a third part whereby the three parts may have apertures thereof, which are aligned in the closed position, displaced from one another in the open position to permit the insertion or removal of another member (e.g. the mould article, an insert, punch, etc.) through the apertures. The said two parts may be received by carriers each mounted on a rotary shaft the shafts preferably having a common axis.

Each shaft may carry a cam adapted to co-operate with at least one abutment which is arranged to cause rotary movement of its shaft during relative bodily movement of the cam and the abutment. The two carriers are preferably mounted on a base which is arranged for movement between at least two stationary positions (hereinafter referred to as stations), and the base may comprise a turn-table having an axis of rotation lying parallel to the axis or axes of rotation of the carrier shafts such that rotation of the turn-table bodily carries the carriers between the two stations.

One convenient mechanism incorporates cams which are received for movement during rotation of the turn-table within a pair of channels formed in a support, each channel having a pair of curved retaining walls of which the outer is concave and the inner convex, the curved retaining walls having the axis of the turn-table as their centre, the retaining walls being arranged to prevent rotation of the respective cam members in certain regions, an abutment or abutments projecting into each channel to lie in the path of the cam members during their movement between stations. The cam member may have two pairs of curved peripheral surfaces one of each pair being convex and conforming to the outer concave retaining wall and the other of each pair being concave and conforming to the inner convex retaining wall.

Each cam member may have two abutment systems arranged respectively to cause clockwise and anti-clockwise movement of the cam member. For example one abutment system may comprise a single projection extending into the channel adjacent its concave retaining wall and arranged to co-operate with a cam slot situated between the two convex peripheral surfaces of the cam member and extending inwardly between the convex peripheral surfaces thereof. The other abutment system may comprise a pair of projections extending into the channel adjacent its convex retaining wall and arranged to co-operate with a pair of spaced cam slots situated between the concave peripheral surfaces of the cam and extending inwardly between the concave peripheral surfaces thereof.

Each of the concave surfaces of the cam member may afford between it and one of the pair of spaced slots, a cam portion lying a distance from the rotary axis of the cam member which is greater than the distance between that axis and the inner convex retaining wall of the channel, which retaining wall is recessed to allow entry of said portions during rotation of the cam member.

The invention may be carried into practice in a number of ways but one specific embodiment will now be described by way of example with reference to the accompanying drawings in which:

Figure 1:
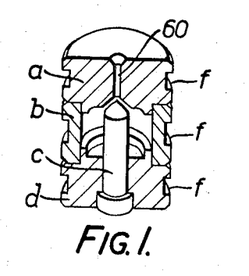
FIG. 1 is a sectional perspective view of a sub-mould employed for the moulding of commutators and which is adapted to be loaded and unloaded by a servicing machine in accordance with the present invention.

Referring firstly to FIG. 1 this shows the four main parts of a sub-mould which is used for the manufacture of commutators by the transfer moulding process. The sub-mould incorporates a middle chase *b* a bottom force *d* having a central pin *c* for locating a bush which, will form the central bush of a commutator, and a top force *a* which is superimposed on the middle chase *b*. As shown the top and bottom forces *a* and *d* have downwardly and upwardly extending annular flanges respectively to engage in the upper and lower ends of the bore of the middle chase *b* in order axiallly to locate the sub-mould parts in the manner shown in FIG. 1.

It is to be noted that each of the top and bottom forces and the middle chase *c* have external grooves *f* by which they may be assembled into or removed from the servicing machine shown in the remaining figures.

Figure 2:
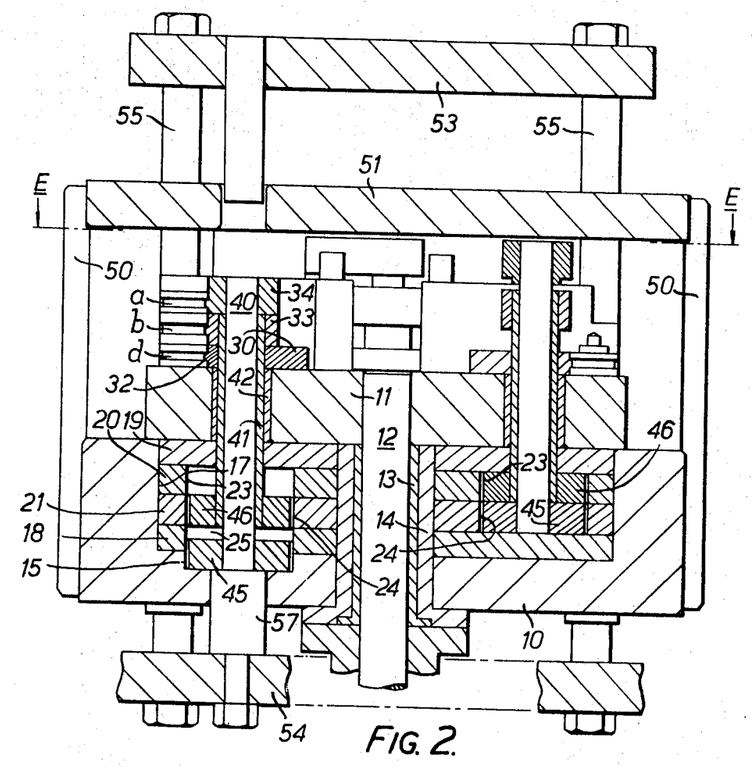
FIG. 2 is a sectional side elevation of a servicing machine according to the invention taken on the line A—A of FIG. 3.

Referring now to FIG. 2 the servicing machine shown therein has a stationary bed 10 upon which is mounted a turntable 11 having four identical stations each for carrying a sub-mould of the kind shown in FIG. 1, the table being capable of being indexed through four 90° intervals by means of a shaft 12 extending through a sleeve bearing 13 which is mounted within a stationary sleeve 14 extending vertically through the bed 10. At one station which as will be described will be called station 1, the bed 10 has a recess 15 (shown to the left in FIG. 2). Above the plane of the top of the recess 15 the bed has a cylindrical cavity 17 within which are stacked four rings comprising lower and upper rings 18 and 19 respectively and upper and lower intermediate rings 20 and 21 respectively, the intermediate rings affording annular channels 23 and 24 respectively. It will be seen on the left in FIG. 2, which represents a section through the station of the servicing machine situated at 6 o'clock in FIG. 3, and which will hereafter be referred to as station 1, that the ring 18 at this station has a circular aperture 25 for a purpose to be described.

Figure 3:
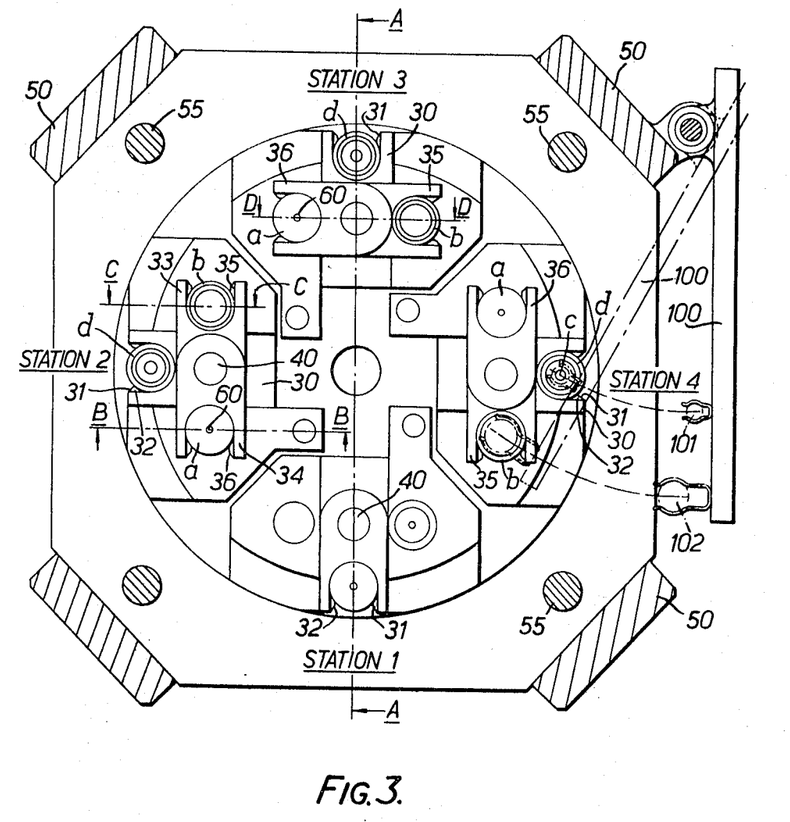
FIG. 3 is a sectional plan taken on the line E—E of FIG. 2.

Each of the four identical stations on the turn-table 11 incorporates a lower carrier assembly 30, which, as shown in FIG. 3 affords a radially outwardly facing forked recess 31 when viewed in plan which is arranged to receive the lower force *d* of the sub-mould and locate it by means of a flange 32 which engages the groove *f* of the lower force *d*. Mounted to rotate about a vertical axis above the lower assembly 30 are a pair of carriers, namely an intermediate carrier 33 and an upper carrier 34. The carriers 33 and 34 have corresponding forks 35 and 36 respectively arranged to receive the middle chase *b* and the upper force *a* of the sub-mould. The upper carrier 34 is secured to a shaft 40 extending vertically through a sleeve shaft 41 upon the upper end of which the intermediate carrier 33 is secured. The sleeve shaft 41 of the intermediate carrier 33 extends through a sleeve bearing 42 in the turn-table 11. It willl be noted from FIG. 2 that the shaft 40 of the upper carrier 34 extends below the lower end of the sleeve shaft 41 of the intermediate carrier 33. Mounted on the lower ends of the shaft 40 and the sleeve shaft 41 are cam members which may be termed for convenience star gears. The star gears, which comprise a lower gear 45 on the shaft 40 and an upper gear 46 on the sleeve shaft 41 have identical outer profiles when viewed in plan, this profile being shown in FIGS. 9 and 10. The action of these gears will be described in more detail but it is to be noted that they are capable of movement with their respective shafts not only in a rotary manner about their axes but vertically both together and with respect to one another between various positions. FIG. 2, on the left, illustrates the relative positions of the gears 45 and 46 in their lowermost positions when the lower gear 45 is received in the recess 15 whilst the upper gear 46 lies within the annular channel 24. It is to be noted from the left hand side of FIG. 2 that in these lowermost positions the gears 45 and 46 are separated from one another. In these lowermost positions the carriers 33 and 34 are nested upon one another and upon the lower carrier assembly 30 so that the carriers are capable of receiving or unloading complete sub-moulds of the configuration shown in FIG. 1.

Secured to the bed 10 is a framework which incorporates side legs 50 and a horizontal top member 51.

Mounted to reciprocate up and down with respect to the bed 10 and the framework are top and bottom plates 53 and 54 respectively which are secured at their peripheries to four vertical rods 55 which pass vertically through the top member 51 and the bed 10. The manner in which the top and bottom plates 53 and 54 are lifted and lowered by the rods 55 is not shown but this will be synchronised with other operations of the servicing machine including the indexing of the turn-table 11 between its four stations. It is to be noted from the left hand side of FIG. 2 that the bottom plate 54 has an upwardly etxending punch 57 in the bottom of the bed 10 which punch serves to lift the lower star gear 45 upon an upstroke at station 1. This lifting of the star gear 45 will initially separate the upper carrier 34 from the intermediate carrier 33. As soon as the star gear 45 engages the underside of the gear 46 this latter gear will also be lifted to raise the intermediate carrier 33 from the lower carrier assembly 30. In the uppermost position, the gears 45 and 46 are received within the annular channels 24 and 23 respectively as shown to the right in FIG. 2. Once the gears 45 and 46 have been lifted above the top plane of the lower ring 18 the gears can of course be moved within their annular channels by rotation of the turn-table 11. For this reason it is to be noted that before any indexing of the turn-table takes place it is essential that the rods 55 should have moved the bottom plate 54 to its uppermost position to ensure that indexing is possible.

Once the carriers 33 and 34 have been separated from the lower carrier assembly 30 and also from one another they are capable of rotary movement by means of their respective shafts 41 and 40. The precise manner in which this occurs by using the gears 45 and 46 will be discussed in detail later but it may be noted that during an indexing movement from station 1 to station 2 in a clockwise direction as viewed in FIG. 3 the top carrier 34 undergoes a 90° anticlockwise movement with respect to the lower carrier assembly 30 whilst the intermediate carrier 33 undergoes a 90° clockwise movement with respect to the lower carrier assembly. In this manner whilst the bottom force *d* is retained by the lower carrier assembly 30, the middle chase *b* will be carried by means of the intermediate carrier 33 to the position shown in FIG. 3, the middle chase at this time containing a completed commutator which was present in the closed mould when the mould as a whole was inserted at station 1. The top force *a* will be rotated with the top carrier 34 to the position shown in FIG. 3 so that the three carriers are at station 2 fanned apart when viewed in plan. The carriers remain in these respective positions both in successive station 3 (at 12 o'clock in FIG. 3) and at station 4 (which is at 3 o'clock in FIG. 3). It is only upon indexing between station 4 and station 1 that the intermediate and upper carriers are realigned with the lower carrier assembly 30 in order to bring the parts of the sub-mounted one above the other prior to a lowering movement and removal from the servicing machine.

Figure 4:
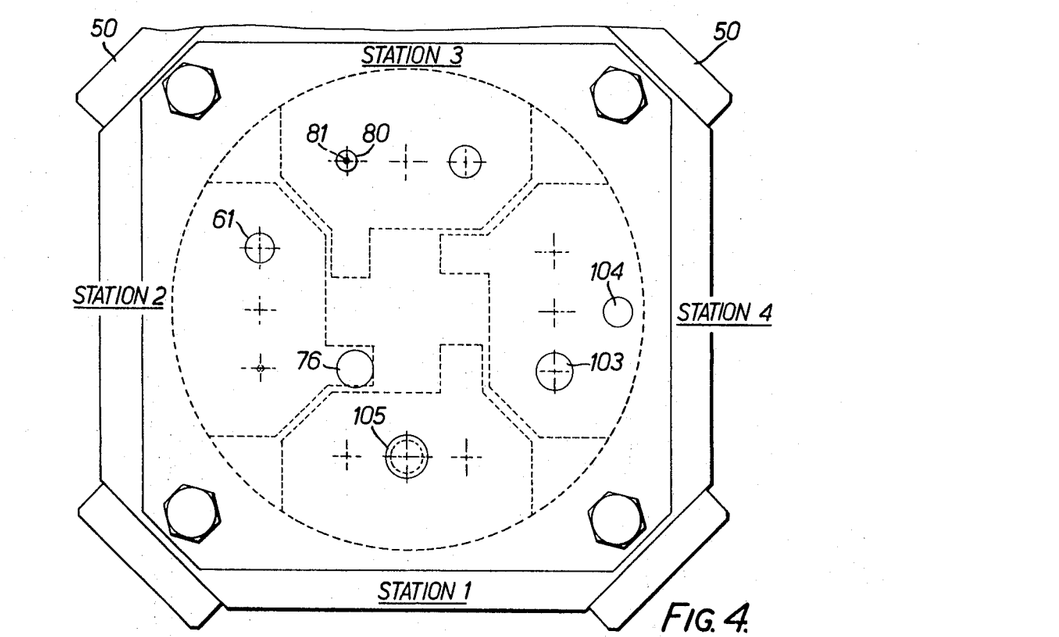
FIG. 4 is a plan view of the machine shown in FIG. 2.
Figure 6:
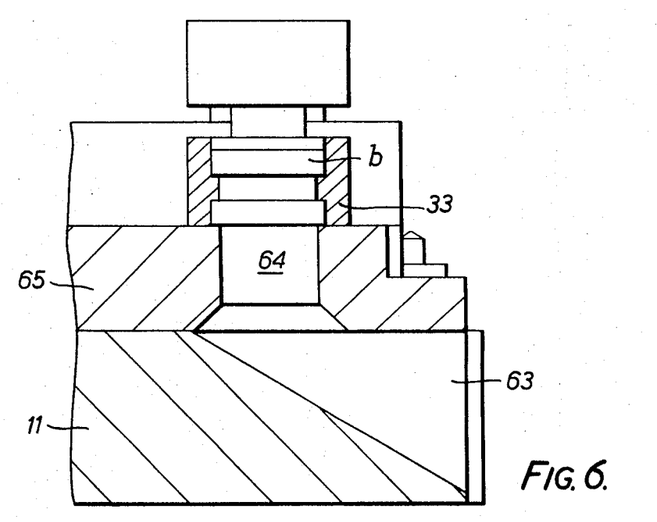
FIG. 6 is a scrap sectional elevation on the line C—C of FIG. 3.

At station 2 various operations are carried out in order to eject both the commutator from the middle chase $b$ carried by the intermediate carrier 33 and also what is termed the "mould discard" which will be overlying the top force $a$ and also extending through a sprue 60 therein through which moulding material is transferred into the mould. The manner in which the completed commutator is removed from the middle chase $b$ can be seen by reference to FIG. 6 and also station 2 which is the very right hand station in FIG. 8. A commutator ejecting punch 61 (see FIGS. 4 and 8) extends downwardly from the top reciprocating plates 53 this punch being aligned with the axis of the middle chase and therefore being capable of extending completely through the middle chase to force the completed commutator from the lower end thereof. For this purpose, as shown in FIG. 6, the turn-table 11 has a chute 63 into which the completed commutator can be ejected via a vertical passageway 64 formed in a ledge 65 of the table 11, upon which the carrier 33 rests at this stage.

Figure 5:
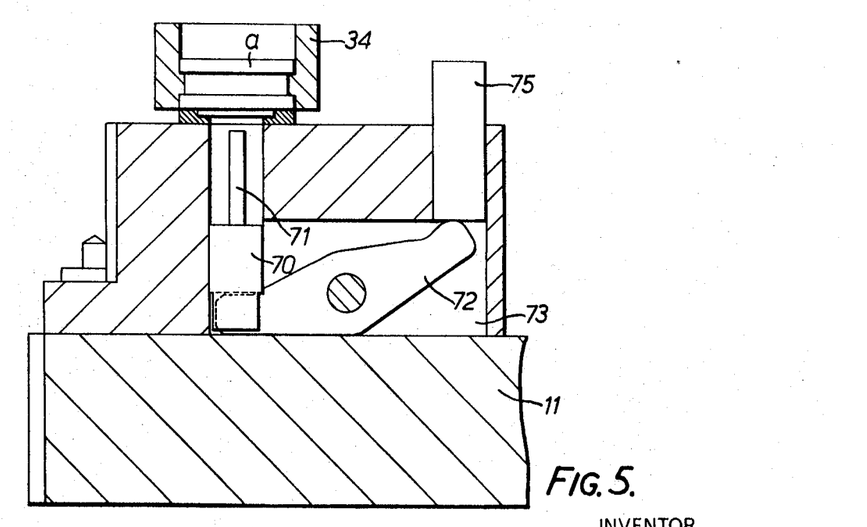
FIG. 5 is a scrap sectional elevation on the line B—B of FIG. 3.
Figure 7:
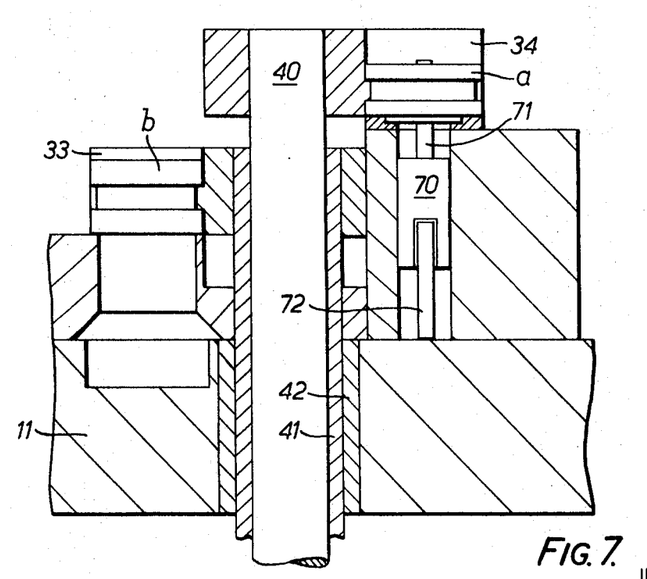
FIG. 7 is a scrap sectional elevation on the line D—D of FIG. 3.
Figure 8:
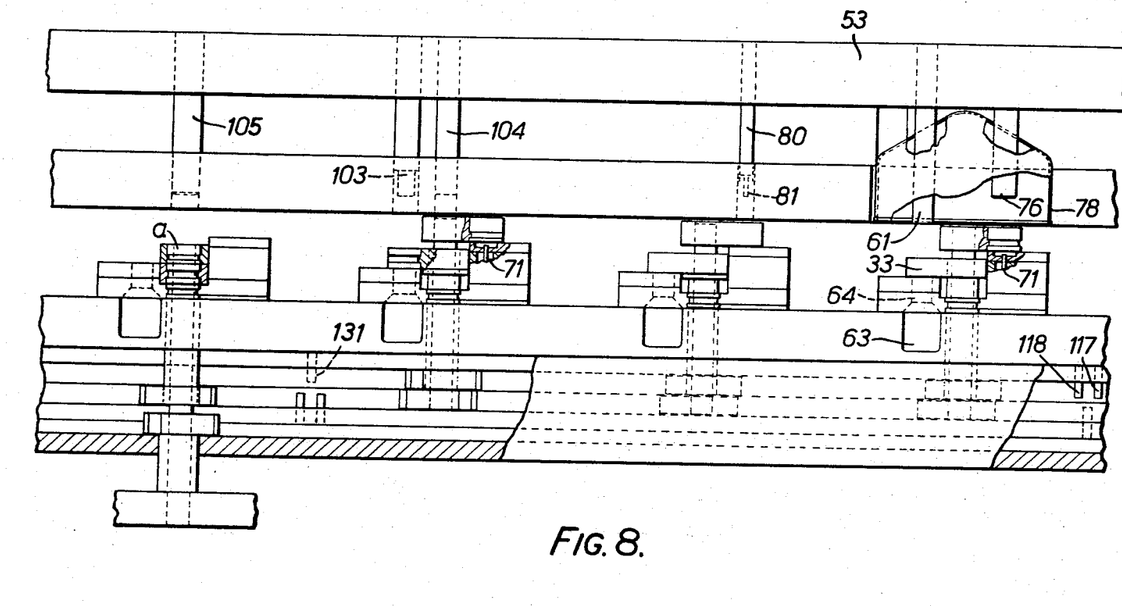
FIG. 8 is a developed view of the turn-table of the servicing machine showing its four stations.

Whilst the completed commutator is ejected downwards, the mould discard in the sprue 60 and above the upper force $a$ are ejected upwardly by means of a discard ejecting punch 70 shown in FIGS. 5 and 7. The punch 70 has a vertically extending pin 71, which is also partially shown in FIG. 8, which is adapted to pass through the sprue 60 to clean it and to force the discard from above the top force $a$. Thus the punch 70 is mounted for reciprocal up and down movement, the upward movement being caused by a bell crank 72 mounted in a recess 73 above the turn-table 11, the end of the bell crank opopsite to the punch 70 having an operating plunger 75 which is forced downwards by a discard ejector actuator 76 shown in FIG. 8 and also in plan in FIG. 4. It will be appreciated that the moulding ejector punch 70 and the discard ejector actuator 76 each operate when the top plate 53 moves downwardly. As shown to the right in FIG. 8, situated around the moulding ejector punch 61 and the discard ejector actuator 76, is a vacuum extracting hood 78 by which the discard and moulding flash is removed. Before indexing the turn-table to station 3 the plate 53 is moved upwardly to remove the ejecting punch 61 and the discard ejector actuator from the rotatary path of the carriers. As has been mentioned the carriers remain in their fanned open positions during the indexing movement and in station 3, upon downward movement of the top plate 53, the discard ejector punch 70, the bell crank 72 and the plunger 75 are restored to their positions of FIG. 5 by means of a discard ejecting punch retractor 80 which extends downwardly from the plate 53 as shown in FIG. 8. The retractor 80 has a pin 81 which can pass through the sprue 60 in the top force $a$ to engage the upper end of the pin 71 of the ejector 70 in order to carry out this return operation. Some form of sensing means will be associated with the pin 81 to ensure that if this becomes damaged, due for example to complete blockage of the top force of a sub-mould, the servicing machine will immediately come to a halt. After the top plate 53 has been raised again to move the pin 81 clear of the sprue 60 the turn-table can be indexed to station 4.

At station 4 the three parts of the sub-mould will still be in their fanned apart positions as shown in FIG. 3 and at this station are in a position to receive a commutator shell and bush respectively in the middle chase $b$ and on the upwardly extending pin $c$ of the lower force $d$ respectively. For this purpose, as shown in FIG. 3, a loading arm 100 is employed which carries, by means of spring clips the bush 101 and the shell 102 by arcuate movement, into line with the middle chase and bottom force respectively. Thereafter the shell 102 may be forced by a shell loading punch 103 into the middle chase $b$. Also a bush loading punch 104 forces the bush 101 on to the pin $c$ upstanding from the lower force $d$ which is still located in the fork 31 of the lower carrier assembly 30.

Thereafter the shell loading and bush loading punches will be raised by upward movement of the plate 53 and the carrier assembly indexed to station 1. During this indexing movement the top and intermediate carriers will be rotated with respect to the lower carrier assembly 30 to restore the three carriers one above the other at station 1. The next downward stroke of the top plate 53 will bring a sub-mould closing punch 105 down on to the shaft 40 in order to force the three carriers downwards into nesting engagement so that the loaded sub-mould can be removed from the servicing machine at station 1 and substituted by a further sub-mould, received from the moulding machine, and containing a completed commutator, whereafter the cycle will be repeated.

Figure 9:
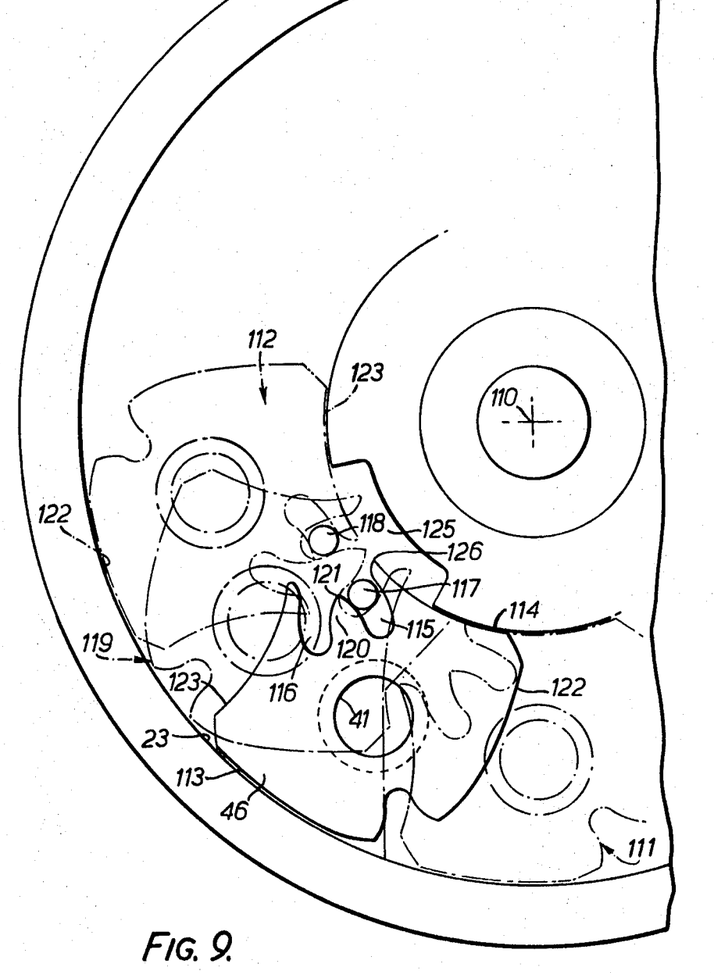
FIG. 9 shows the manner in which the star gear for the rotary movement of the carriers co-operates with a pair of pins to open the sub-mould.
Figure 10:
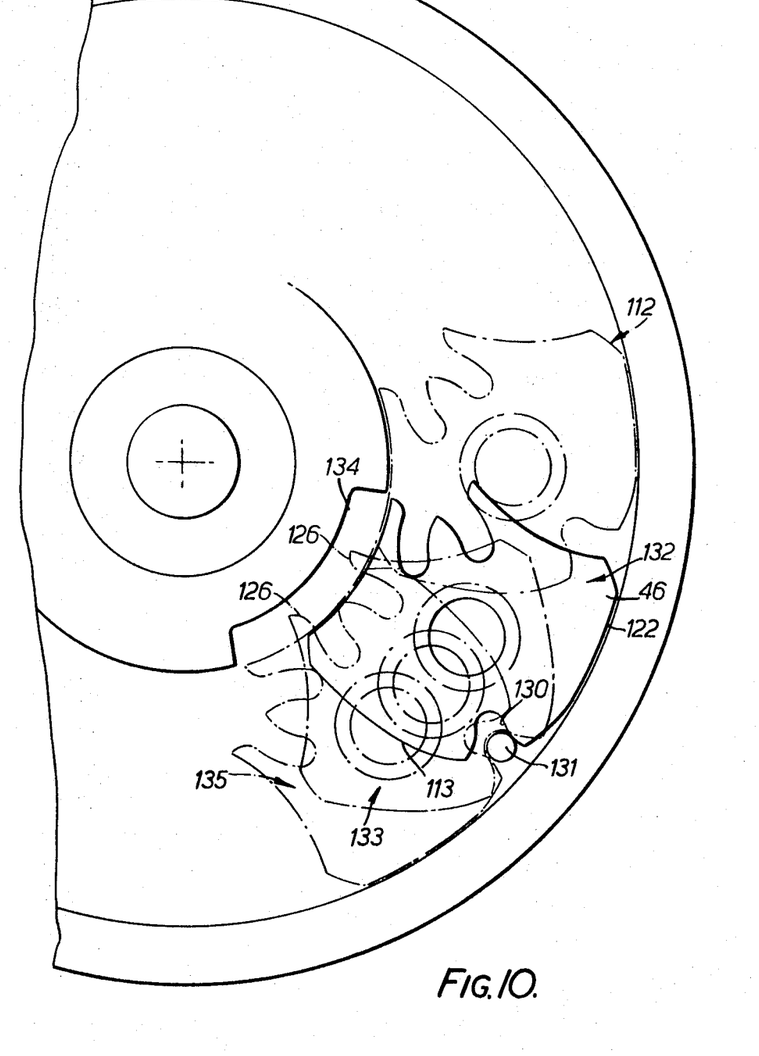
FIG. 10 shows the manner in which the star gear for the rotary movement of the carriers co-operates with a single pin to close the sub-mould.

FIGS. 9 and 10 show the manner in which the gears 45 and 46 on the lower ends of the shafts 40 and 41 are actuated to turn the carriers between stations 1 and 2 into a fanned out position and between stations 4 and 1 into an aligned position. FIG. 9 shows the gear 46 which is carried by the sleeve shaft 41 and this figure shows the gear in the annular channel 23. Accordingly, as the turn-table 11 is indexed around its axis 100 in a clockwise direction as viewed in FIG. 9 through 90°, the gear 46 will move from its chain dotted position 111 to its chain dotted position 112. Between these two positions which represent the respective positions of the gear 46 at stations 1 and 2, the gear will first reach its full line position as shown in FIG. 9. As shown the gear incorporates a generally star shaped peripheral surface having peripheral sections 113 and 114 of arcuate form, the arcs being struck about the axis of rotation 110 of the turn-table such that the surfaces 113 and 114 are respectively guided by the external and internal surfaces of the channel 23 during the arcuate movement of the gear from its position 111 at station 1 to its full line position as shown in FIG. 9. In this full line position one of two deep slots 115 and 116 formed in the periphery of the gear begins to receive the first of two depending pins 117 and 118, which pins are also shown in FIG. 8. The two deep slots 115 and 116 are spaced by a pointed projecting portion 120 of the gear having smoothly curved sides which form cam surfaces merging at a vertical line 121. As the gear 46 is moved clockwise from its full line position of FIG. 9 the pin 117 will cause, due to its co-operation with the sides of the slot 115, a rotary movement of the gear 46 about its own axis, i.e. that of the shaft 41, firstly through 45° so that the gear will adopt the chain dotted position 119 at which time the projection 120 will be received between the pins 117 and 118 as shown. Further arcuate movement of the gear will then cause the pin 118 to bear on the side of the projection 120 which forms part of the slot 116 in order to continue the rotary movement of the gear about its shaft axis until the gear will finally turn through a further 45° making a total of 90° of movement, at which time further curved peripheral surfaces 122 and 123 of the gear will be received by the confining walls of the channel 23. It is to be noted that the inner confining wall of the channel 23 in the region of the pins 117 and 118 is provided with an inwardly directed recess 125 so that projecting portions 126 of the gear can be received in this recess during the gear's movement between station 1 and station 2.

FIG. 10 shows the manner in which the gear 46 is restored to its initial position. For this purpose the gear has a further external slot 130 between the surfaces 122 and 113 which slot co-operates with a single pin 131 extending downwards into the patch of the gear between station 4 and station 1. Clockwise rotation of the turn-table as viewed in FIG. 10 will cause the gear 46 to move from its arcuate position 112 in that figure, which corresponds to the arcuate position 112 in FIG. 9, via a solid line position 132 and a further dotted line position 133 which corresponds to the dotted line position 119 in FIG. 9, for which purpose a further recess 134 is provided to receive the projecting portions 126 of the gear, and finally to a chain dotted position 135 wherein the gear is restored to the position equivalent to that indicated at 111 in FIG. 9.

The gear 45 is rotated in a precisely similar manner, the pins in this case projecting upwardly as shown in FIG. 8.

What we claim as our invention and desire to secure by Letters Patent is:

1. In apparatus for handling molds which have a pair of portions defining opposed parts of a mold cavity and another portion defining an intermediate portion of such mold cavity, the improvement comprising
    a pair of carriers respectively supporting two of said mold portions in first positions adjacent to and in alignment with each other and the remaining mold portion to provide said mold cavity,
    and means for shifting said carriers and thus respective mold portions carried thereby to second positions wherein the latter are spaced from and out of alignment both with each other and said remaining mold portion following a molding operation to provide for ejection of a molded article from one of said mold portions and ejection of molded waste material from another of said mold portions.

2. A machine as claimed in claim 1 in which the carriers are initially separable in a first direction and then movable relatively to one another in a second direction.

3. A machine as claimed in claim 2 in which the first direction comprises a linear direction and the second direction an arcuate direction.

4. A machine as claimed in claim 3 in which the carriers are each mounted on a rotary shaft, relative rotation of the shafts causing said relative movement in the second direction.

5. A machine as claimed in claim 4 in which the rotary shafts are relatively displaceable in an axial direction to cause said relative movement in the first direction.

6. A machine as claimed in claim 4 in which the rotary shafts have a common axis.

7. A machine as claimed in claim 6 wherein each shaft carries a cam adapted to cooperate with at least one abutment which is arranged to cause rotary movement of the shaft during relative bodily movement of the cam and the abutment.

8. A machine as claimed in claim 7 wherein the carriers are mounted on a base which is arranged for movement between at least two stations.

9. A machine as claimed in claim 8 in which the base comprises a turn-table having an axis of rotation lying parallel to the axis or axes of rotation of the shafts such that rotation of the turn-table bodily carries the carriers between the two stations.

10. A machine as claimed in claim 9 in which the cams are received for movement during rotation of the turn-table within a pair of channels formed in a support, each channel having a pair of curved retaining walls of which the outer is concave and the inner convex, the curved retaining walls having the axis of the turn-table as their centre and being arranged to prevent rotation of the respective cam members in certain regions, an abutment or abutments projecting from the support into each channel to lie in the path of the cam members during their movement between stations.

11. A machine as claimed in claim 10 wherein each cam member has two pairs of curved peripheral surfaces one of each pair being convex and conforming to the outer concave retaining wall and the other of each pair being concave and conforming to the inner convex retaining wall.

12. A machine as claimed in claim 10 wherein each cam member has two abutment systems arranged respectively to cause clockwise and anticlockwise movement of the cam member.

13. A machine as claimed in claim 12 wherein one abutment system comprises a single projection extending into the channel adjacent its concave retaining wall and arranged to co-operate with a cam slot situated between the two convex peripheral surfaces of the cam member and extending inwardly between the convex peripheral surfaces thereof.

14. A machine as claimed in claim 12 wherein the other abutment system comprises a pair of projections extending into the channel adjacent its convex retaining wall and arranged to co-operate with a pair of spaced cam slots situated between the concave peripheral surfaces of the cam and extending inwardly between the concave peripheral surfaces thereof.

15. A machine as claimed in claim 14 wherein the concave surfaces of the cam member each affords between it and one of the pair of spaced slots a cam portion lying a distance from the rotary axis of the cam member which is greater than the distance between that axis and the inner convex retaining wall of the channel, which retaining wall is recessed to allow entry of said portions during rotation of the cam member.

16. A machine as claimed in claim 9 in which the turntable is arranged for rotation between four stations.

17. A machine as claimed in claim 16 wherein the carriers, in the first position, are at one (first) station; are caused to move to their second position between the first station and the next (second) station; to remain in their second position during rotation from the second and third stations; and to return to their first position during rotation from the fourth to the first station.

18. A machine as claimed in claim 17 including ejector punches arranged to be inserted into at least one mold portion at said second station.

19. A machine as claimed in claim 17 including loading mechanism for automatically introducing one or more members into at least one mold portion at said fourth station.

20. A machine as claimed in claim 17 including mechanism to apply a pressure to said mold portions when the latter are at said first station.

21. A machine as claimed in claim 20 in which the said pressure applying mechanism comprises a punch situated at said first station.

22. A machine as claimed in claim 17 wherein ejector punches are arranged to be inserted into at least one mold portion at said second station,
    wherein a loading mechanism is provided for automatically introducing one or more members into at least one of said mold portions at said fourth station,
    wherein pressure applying means is provided for applying a pressure to said mold portions when the latter are at said first station,
    and wherein said ejector punches, said loading mechanism and said pressure applying means are moved simultaneously by a common actuator body.

23. A machine as claimed in claim 22 including carrier separation means adapted to cause said initial separation of the carrers in the first direction, which means is connected to the common actuator body.

24. A machine as claimed in claim 23 wherein the said carrier separation means and the common actuator body are mounted for reciprocable movement with respect to the turn-table, the direction of reciprocable movement being parallel to the turn-table axis.

References Cited
UNITED STATES PATENTS

| | | | |
|---|---|---|---|
| 2,226,408 | 12/1940 | Nast | 18—30 UC UX |
| 2,327,227 | 8/1943 | Tucker | 18—20 I X |

(Other references on following page)

UNITED STATES PATENTS

| | | | |
|---|---|---|---|
| 2,333,059 | 10/1943 | Tucker | 18—20 I X |
| 2,431,843 | 12/1947 | Swoger | 18—20 I X |
| 2,803,853 | 8/1957 | Brazier | 18—20 R |
| 2,830,323 | 4/1958 | Krebs et al. | 18—20 S |
| 2,909,807 | 10/1959 | Matsudo | 18—20 R |
| 3,091,810 | 6/1963 | Turner | 18—20 I X |
| 3,173,176 | 3/1965 | Kobayashi | 18—20 I X |
| 3,259,356 | 7/1966 | Hehl | 18—30 UC X |
| 3,319,300 | 5/1967 | Hehl | 18—30 UC X |
| 3,315,315 | 4/1967 | Triulze | 18—20 I X |
| 3,327,352 | 6/1967 | Osgood | 18—20 I |
| 3,482,284 | 12/1969 | Rees | 18—30 UC |

FOREIGN PATENTS

| | | | |
|---|---|---|---|
| 825,167 | 12/1951 | Germany | 18—30 UC |

J. HOWARD FLINT, JR., Primary Examiner

U.S. Cl. X.R.

18—30 UC